United States Patent
Griffiths

[15] 3,639,958
[45] Feb. 8, 1972

[54] ROLLER AND METHOD OF MAKING SAME

[72] Inventor: Wilfred Griffiths, New South Wales, Australia

[73] Assignee: Abrasive Aids Pty. Limited, Banktown, Australia

[22] Filed: May 16, 1969

[21] Appl. No.: 825,174

[52] U.S. Cl. ............................................................29/130
[51] Int. Cl. ..........................................................B60b 7/04
[58] Field of Search..................29/130, 129.5, 120, 128, 127

[56] References Cited

UNITED STATES PATENTS

| | | | |
|---|---|---|---|
| 1,978,940 | 10/1934 | Guy | 29/130 UX |
| 1,997,442 | 4/1935 | Walsh | 29/130 UX |
| 2,021,371 | 11/1935 | Manchester | 29/130 UX |
| 2,597,858 | 5/1952 | Freedlander | 29/130 |
| 2,804,678 | 9/1957 | Rockoff | 29/130 X |
| 3,156,968 | 11/1964 | White | 29/130 X |
| 3,514,312 | 5/1970 | Gardiner | 29/132 X |

FOREIGN PATENTS OR APPLICATIONS

| | | | |
|---|---|---|---|
| 539,220 | 9/1941 | Great Britain | 29/128 |

*Primary Examiner*—Alfred R. Guest
*Attorney*—Meyer, Tilberry and Body

[57] ABSTRACT

A roller comprises a rigid cylindrical sleeve formed of fiber glass which is coated with resin. The outer surface of the sleeve is machined to remove substantially all visible resin therefrom and to expose the fiber glass. The fibers of the fiber glass provide substantially fuzzy surface characteristics on the outer surface of the sleeve. An elastomeric sleeve is molded around the outer surface of the rigid sleeve. Fibers of the fiber glass extend into the elastomeric sleeve and define a zone having an elasticity modulus which is between that of the rigid sleeve and the elastomeric sleeve. The roller is formed by coating fiber glass filaments with resin and winding them upon a rotating mandrel. When a desired thickness of resin coated filaments are on the mandrel, the filaments are cut and the assembly is heated to partially cure the resin while the mandrel is rotated. Following the final curing of the rigid sleeve, it is placed in a lathe where its outer surface is machined to remove free visible resin on its exterior surface and to expose the fiber glass fibers. The exterior of the rigid sleeve is then coated with a bonding agent and an elastomeric sleeve is bonded to its exterior surface.

8 Claims, 10 Drawing Figures

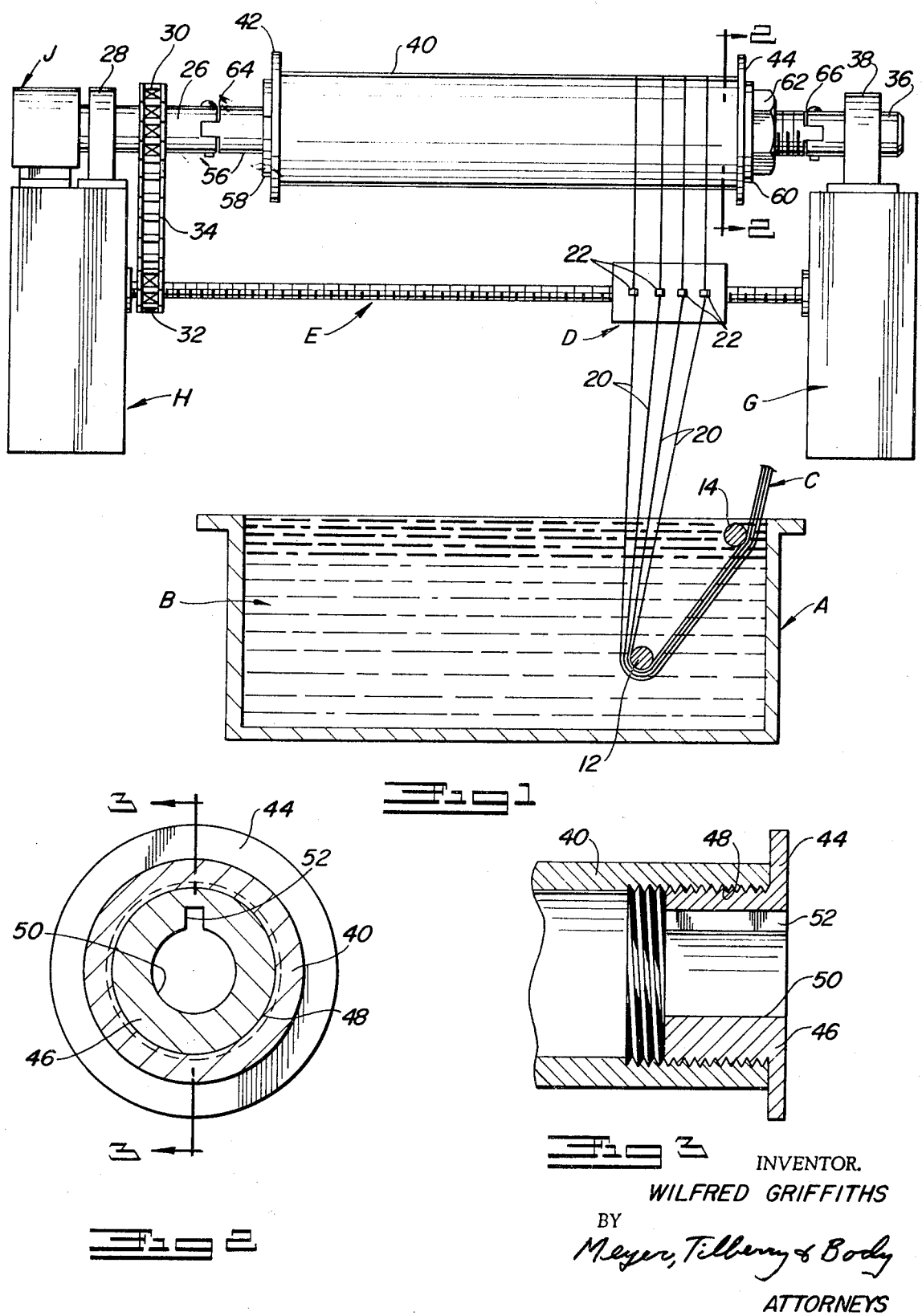

INVENTOR.
WILFRED GRIFFITHS

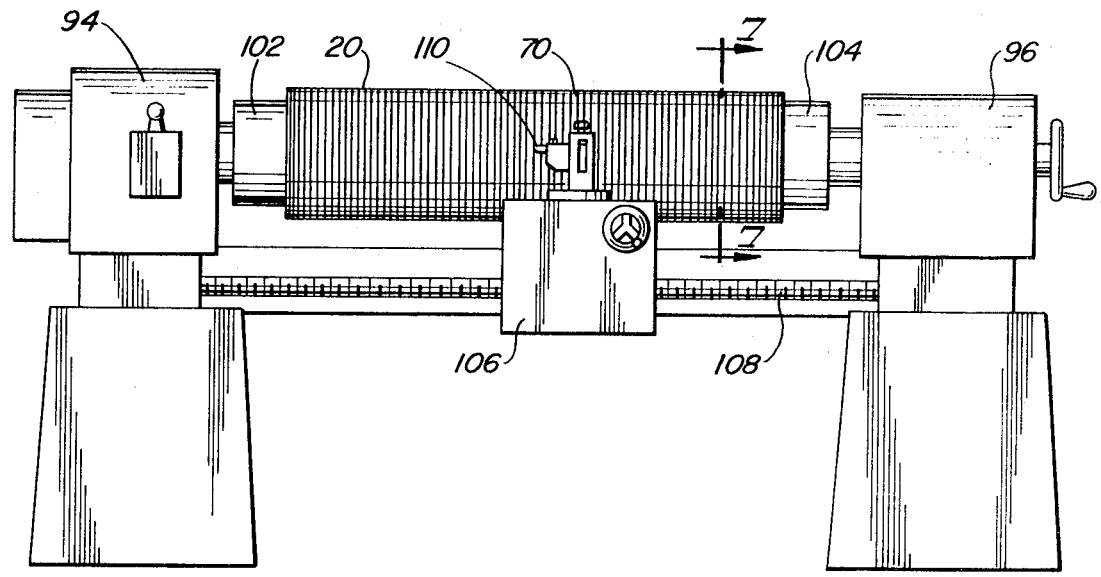
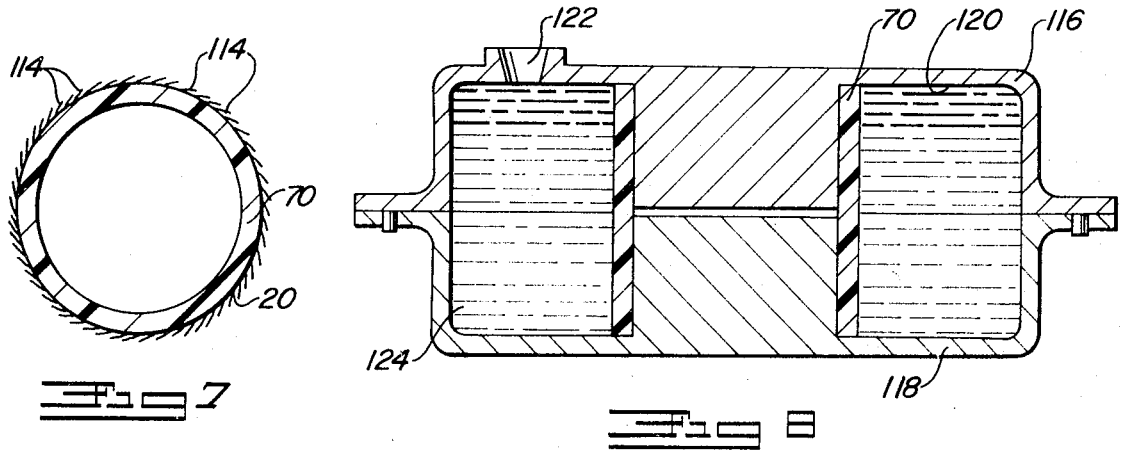
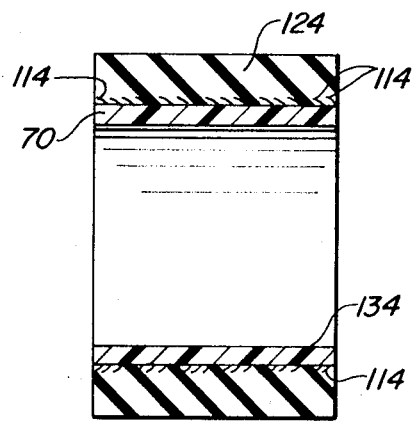
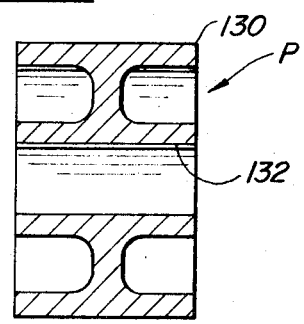
INVENTOR.
WILFRED GRIFFITHS
BY
Meyer, Tilberry & Body
ATTORNEYS

ROLLER AND METHOD OF MAKING SAME

BACKGROUND OF THE INVENTION

This application pertains to the art of rollers and methods of making rollers, and more particularly to rollers of the type having an elastomeric sleeve bonded to a rigid inner sleeve. The invention is particularly applicable to rollers used in making paper and forming steel although it will be appreciated that the invention has broader aspects and may be used in any application in which an elastomeric roller or tire is used.

Resilient rollers or tires are commonly formed by molding elastomeric material around a metal hub. The elastomeric material is bonded directly to the metallic hub. In such an arrangement, deterioration or destruction of the elastomeric material, which requires replacement of the roller or tire, necessitates replacement of the entire roller including its hub. The old roller must then be sent to a specialty shop where the elastomeric material can be stripped from the metallic hub and replaced with new elastomeric material. The metallic hubs for large rollers, such as used in steel and paper mills, are extremely heavy and difficult to handle. In addition, molding an elastomeric material directly onto a metallic surface often produces a poor bond due to high heat transfer from the metallic hub to the elastomeric material during curing.

It would be desirable to have a roller in which elastomeric material could be replaced directly at the site where the roller is being used so that handling of the metallic roller hub, and shipping it around for replacement of the elastomeric material, would be unneccessary. It would also be desirable to provide a roller in which an elastomeric outer sleeve has an extremely good bond to an inner rigid sleeve and in which the band is not effected by high heat transfer from the rigid inner sleeve to the elastomeric material while curing.

SUMMARY OF THE INVENTION

In accordance with the present invention, a roller is provided with an inner cylindrical rigid sleeve and an outer cylindrical elastomeric sleeve bonded to the outer surface of the inner sleeve. More specifically, the rigid sleeve is formed from a combination of fibrous reinforcement and resin. The resin is cured to a substantially rigid state and is reinforced by the fibrous material. The resin is removed from the outer surface of the rigid sleeve to expose the fibrous material and define an exterior surface having substantially fuzzy surface characteristics. A bonding agent is applied to the exterior surface of the rigid sleeve and elastomeric material is bonded thereto to form the elastomeric sleeve. Poor heat conduction from the rigid sleeve, due to the material of which it is formed, provides substantially even curing of the elastomeric material. Fibers of the fibrous material in the rigid sleeve extend into the elastomeric material at the interface between the rigid sleeve and the elastomeric sleeve to define a reinforced bonding zone having an elasticity modulus intermediate that of the rigid sleeve and the elastomeric sleeve.

In fiberglass preferred arrangement, the roller of the present invention is formed by coating fiberglass filaments with resin and winding them into a cylindrical shape on a mandrel. When a desired thickness of resin coated fiberglass filaments is placed on the mandrel, the filaments are cut and the mandrel is transferred to a heating zone where it is rotated while the resin cures. Rotation of the mandrel during at least partial curing of the resin insures a substantially cylindrical shape and prevents slumping of the resin material. The resin may be only partially cured while the mandrel is being rotated and then transferred to a final curing oven. Once the resin has cured, a rigid sleeve is defined from resin and fiberglass reinforcement. This sleeve is then positioned in a lathe and rotated while its exterior surface is acted upon by a blunt tool to shatter the resin on its exterior surface and expose the fiberglass filaments. Fibers of the fiberglass filaments then define a substantially fuzzy surface characteristic on the exterior surface of the rigid sleeve. The exterior surface of the rigid sleeve is then coated with a bonding agent and position in a mold. The mold is then charged with elastomeric material and is heated to set the elastomeric material and bond it to the exterior surface of the rigid sleeve. At the interface between the elastomeric material and the rigid sleeve, fibers of the fiber glass filaments extend into the elastomeric material to strengthen the bond and to provide a zone having an elasticity modulus intermediate that of the rigid sleeve and the elastomeric material. This zone of intermediate elasticity modulus reduces high stress concentrations which normally occur at discontinuities between different materials having highly different elasticity moduli.

It is a principle object of the present invention to provide a replaceable elastomeric roller which may be easily installed on a hub.

It is an additional object of the present invention to provide an elastomeric roller in which an elastomeric material is bonded to a rigid inner sleeve with a bond which is very strong and does not deteriorate during curing of the elastomeric material.

It is also an object of the present invention to provide an improved method of making an elastomeric roller.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

FIG. 1 is a front elevational view showing the first step in formation of an elastomeric roller in accordance with the present invention;

FIG. 2 is a cross-sectional view looking in the direction of arrows 2—2 of FIG. 1;

FIG. 3 is a cross-sectional view looking in the direction of arrows 3—3 of FIG. 2;

FIG. 6 is a front elevational view showing a fourth step in the formation of an elastomeric roller in accordance with the present invention;

FIG. 7 is a cross-sectional view looking in the direction of arrows 7—7 of FIG. 6;

FIG. 8 is a cross-sectional elevational view of a mold for use in making the elastomeric roller of the present invention;

FIG. 9 is a cross-sectional view of the roller of the present invention; and

FIG. 10 is a cross-sectional view of a hub on which the roller of FIG. 9 is mounted.

DESCRIPTION OF THE PREFERRED EMBODIMENT

Figure 4:
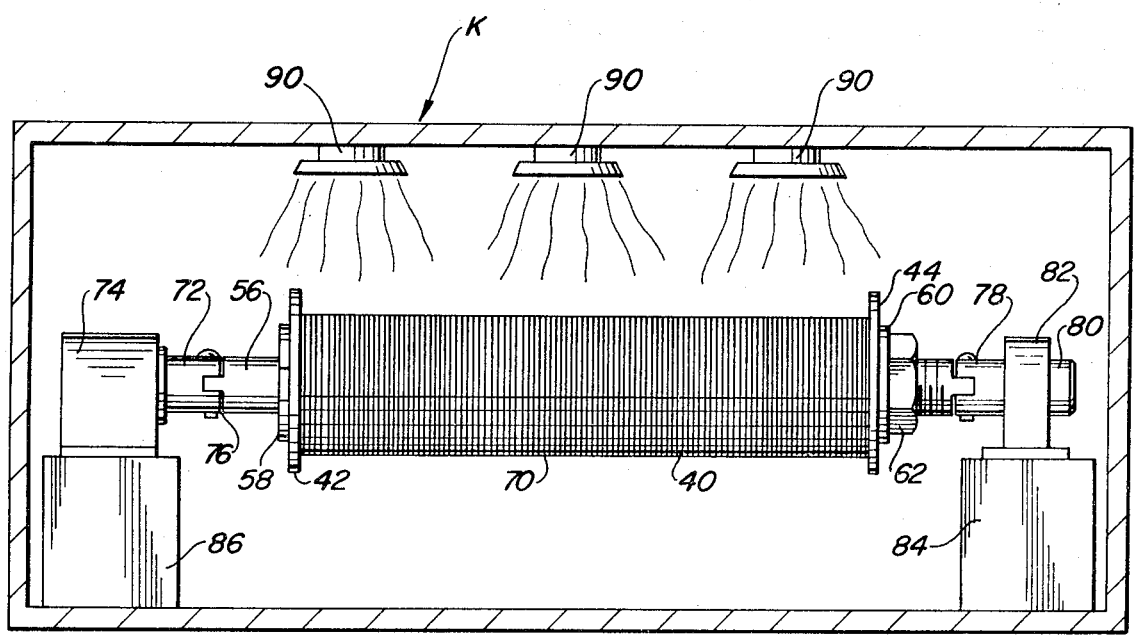
FIG. 4 is a sectional elevational view showing a second step in the formation of an elastomeric roller in accordance with the present invention.

Referring now to the drawings, wherein the showings are for purposes of illustrating the preferred embodiment of the invention only and not for purposes of limiting same, FIG. 1 shows a tank A filled with liquid resin B. Rollers 12 and 14 extend across tank A and guide a bundle of fiberglass filaments C into resin B so that the fiberglass filaments are thoroughly coated with resin. Each filament 20 of bundle C is separated from adjacent filaments as it passes beneath roller 12 so that each filament is insured of a thorough coating of resin B. Each filament 20 extends through guides 22 carried by carriage D.

Carriage D is positioned on a reverse double-threaded screw E which is also often called a continuous screw. Screw E is rotatably journaled in supports G and H. An electric motor J secured to support H includes a power shaft 26 rotatably supported in bearing 28. Power shaft 26 has a sprocket 30 secured thereto for driving sprocket 32 on screw E through chain 34. When screw E is rotated, carriage D will transverse continuously from right to left, and from left to right and so on. A trailing shaft 36 is rotatably supported in bearing 38 on support G.

A cylindrical mandrel 40 has removal end plates 42 and 44 attached thereto. As shown in FIGS. 2 and 3, end plate 44 includes a hub portion 46 which is exteriorly threaded so as to thread into cooperating threads formed on the interior end portion surface of hollow mandrel 40 as at 48. Hub 46 includes a centrally located circular hole 50 having an axial key slot 52 formed therein. For counterclockwise rotation of mandrel 40 when looking in the direction of arrows 2—2 of FIG. 1, end plate 44 may have right hand threads on its hub portion while end plate 42 has left-hand threads so that rotation of mandrel 44 through end plates 42 and 44 will serve to tighten rather than loosen the threaded connections.

In one arrangement, a mandrel shaft 56 has a circumferential groove receiving a C-ring 58. With C-ring 58 positioned on mandrel shaft 56, shaft 56 is extended through the central holes in the hubs of end plates 42 and 44. Shaft 56 preferably has keys extending radially outward therefrom for reception in the keyways of end plates 42 and 44 as described at 52 with reference to FIGS. 2 and 3. The other end of mandrel shaft 56 may then receive a washer 60 and a nut 62 for adjustably tightening the mandrel 40 against C-ring 58. In an arrangement where adjusting tolerances are important, it is possible to replace washer 60 and nut 62 with a C-ring positioned in a circumferential groove in mandrel shaft 56. Mandrel shaft 56 is then connected through a separable coupling 64 with power shaft 26 and through a separable coupling 66 to trailing shaft 36.

With the parts arranged as described, carriage D is placed in position at either the extreme right or left hand position so that guides 22 will guide filaments 20 onto the extreme right or left-hand end portion of mandrel 40. Filaments 20 are then extended through guides 22 and placed on mandrel 40. Motor J is then energized to begin rotation of mandrel 40 and screw E. The driving train, and the feed rate of carriage D on screw E, is preferably synchronized so that a single layer of filaments 20 are wound upon mandrel 40 each time carriage D moves a full longitudinal stroke longitudinally of mandrel 40. This operation is continued until there are a plurality of layers of filaments 20 would upon mandrel 40. It will be recognized that the number of layers 20 to be wound upon mandrel 40 depends upon the size of roller which is being produced. For extremely large rollers, a very thick-walled rigid inner cylinder is required. However, for extremely small elastomeric rollers it is possible to have a very thin walled rigid inner sleeve. When a desired number of layers of filaments 20 are wound upon mandrel 40, motor J is stopped and filaments 20 are severed. The winding operation is preferably stopped when filaments 20 are at an end portion of mandrel 40 so that a uniform thickness is obtained for the layers of filaments wound upon mandrel 40.

It will be recognized by those skilled in the art that filaments 20 may be wetted with resin in many different ways well known such as by spraying and by leading the filaments through a resin bath in a different manner from that described with reference to FIG. 1. It will also be recognized that the apparatus described with reference to FIG. 1 is only diagrammatically illustrative of one arrangement for winding filaments upon a mandrel and those skilled in the art will readily be aware of other conventional apparatus which may be used for this purpose.

Once a desired number of layers of filaments 20 are wound upon mandrel 40, motor J is stopped and filaments 20 are severed. Separable couplings 64 and 66 are then separated so that the assembly of mandrel shaft 56, mandrel 40, end plates 42 and 44, and resin coated filaments 20 on mandrel 40 may be moved to another station. In one arrangement, this assembly may be transferred to a heated oven K of FIG. 4. The wound layers of resin coated filaments 20 on mandrel 40 then define a cylindrical sleeve 70. Mandrel shaft 56 is then connected with power shaft 72 of motor 74 through separable drive coupling 76. The other end of mandrel shaft 56 is connected through separable drive coupling 78 with rotatable trailing shaft 80 rotatably journaled in bearing 82 on support 84. Likewise, motor 74 may be secured to support 86. Heat sources 90 supply heat to the interior of oven K and motor 74 is energized to rotate mandrel 40 while the resin in cylindrical sleeve 70 cures to at least a partially solid state. Rotation of mandrel 40 and sleeve 70 during curing insures that the resin will cure to a substantially cylindrical shape for cylindrical sleeve 70. Once the resin has at least partially solidified, nut 62 and washer 60 may be removed from mandrel shaft 56. The assembly of mandrel 40, cylindrical sleeve 70, and end plates 42 and 44 is then separated by removing mandrel shaft 56 from the holes in end plates 42 and 44. End plates 42 and 44 are then removed from mandrel 40. Cylindrical sleeve 70 is then slid axially from a mandrel 40. If desired, mandrel 40 may be coated with a release agent to prevent resin B from sticking to the exterior surface of mandrel 40 so that cylindrical sleeve 70 may be readily moved axially off from mandrel 40.

Figure 5:
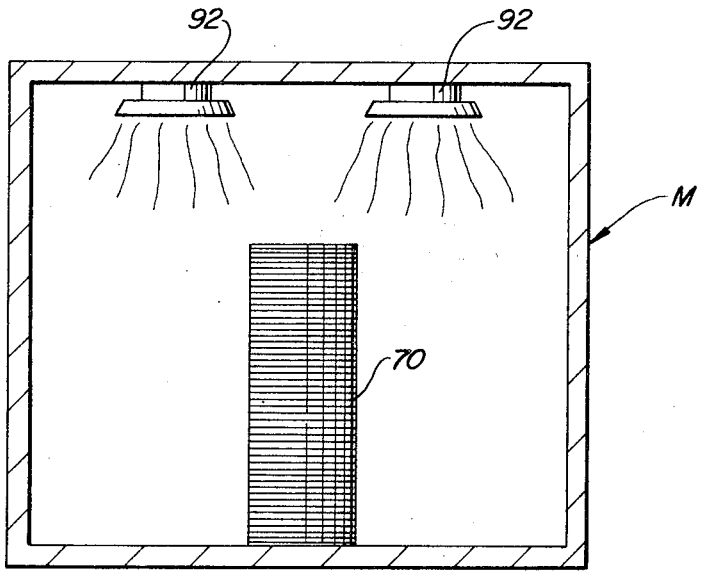
FIG. 5 is a sectional elevational view showing a third step in the formation of an elastomeric roller in accordance with the present invention.

Cylindrical sleeve 70 is then transferred to final curing oven M in FIG. 5. Suitable heaters 92 heat the interior of oven M to a final curing temperature so that the resin in cylindrical sleeve 70 is completely cured.

It will be recognized by those skilled in the art that mandrel 40 may itself be internally heated by either gas burners or electrical resistance heaters so that the resin coating filaments 20 will be partially cured during the winding operation.

When the resin in cylindrical sleeve 70 is finally cured, sleeve 70 is transferred to a lathe as shown in FIG. 6. A conventional lathe may be used and includes a head stock 94 and tail stock 96 between which sleeve 70 is rotatably mounted by internal chucks 102 and 104. A tool carriage 106 is carried by a feed screw 108 so that when screw 108 us rotated tool carriage 106 traverses longitudinally of roller 70. Tool carriage 106 carries a tool bit 110 for operating on the exterior surface of sleeve 70. In a preferred arrangement, a blunt tungsten carbide tool is used for tool 110 so that the resin on the exterior surface of sleeve 70 will be shattered and broken away rather than being cut. In addition, use of a blunt tool to shatter the resin at the exterior surface of sleeve 70 prevents cutting of glass fibers in filaments 20. Use of a very sharp cutting tool would smoothly machine the resin on the exterior surface of sleeve 70 and would also cut fibers of filaments 20 and remove them so that the exterior surface of sleeve 70 would be very smooth. The machining of the exterior surface of sleeve 70 by blunt tool 110 insures a substantially true cylindrical form for the exterior surface of sleeve 70 and also insures a substantially constant wall thickness so that sleeve 70 is dynamically balanced. More importantly, machining of the exterior surface of roller 70 with blunt tool 110 removes substantially all of the visible free resin from the exterior surface thereof. Also, fibers 114 of filaments 20 are then exposed at the exterior surface of sleeve 70 and define a substantially fuzzy surface characteristic for the exterior surface of sleeve 70. Once sleeve 70 has been prepared in this manner, it is ready for application of an outer elastomeric sleeve.

In one arrangement, the fuzzy exterior surface of sleeve 70 in FIG. 7 is thoroughly coated with a bonding agent. Sleeve 70 may then be positioned in a mold having two somewhat identical mold halves 116 and 118 defining a cylindrical cavity 120 around the exterior of sleeve 70. Mold half 116 may have a sprue or inlet opening 122 for charging cavity 120 with elastomeric material 124. Elastomeric material 124 may be defined by natural rubber, Neoprene rubber or polyurethane. While it is possible to charge mold cavity 120 with elastomeric material in a liquid uncured state it is also possible to charge cavity 120 with elastomeric material in a granular form so that it is first liquified and then cured during a vulcanization process. Once cavity 120 has been charged with elastomeric material, the mold is heated in order to cure elastomeric material 124 and bond it to the exterior surface of sleeve 70. In an operation of this type, when sleeve 70 is made of metal, the metal sleeve transfers a considerable amount of heat to the elastomeric material right at the bonding zone. This high transfer of heat to the elastomeric material from the member to which it is being bonded provides an uneven cure of the elastomeric material and reduces the strength of the bond. In the present invention, sleeve 70 is formed of resin and fiberglass filaments so that very little heat is transferred from sleeve 70 to elastomeric material 124 during curing. Once elastomeric material 124 has cured, mold halves 116 and 118 are separated and the assembly of sleeve 70 with elastomeric material 124 bonded thereto is removed. The final assembly is shown in section in FIG. 9. Fibers 114 of filaments 20 on the exterior surface of rigid sleeve 70 extend inwardly of the interior surface of elastomeric sleeve 124. Fibers 114 combine with elastomeric 124 to define a circumferential zone which is formed of combined elastomeric material 124 and fibers 114. This zone will have an elasticity modulus which is somewhat inbetween the elasticity modulus of sleeve 70 and elastomeric sleeve 124. When torque is applied to elastomeric sleeve 124 while rigid sleeve 70 is stationary, the bond between elastomeric sleeve 124 and rigid sleeve 70 tends to be broken. In rollers wherein the bonded zone defines an abrupt change in the modulus of elasticity between the two bonded materials, there is a very high stress concentration in the bonding zone. In the present invention, having a zone in a bonding area which has an elasticity modulus intermediate the two bonded materials, a good deal of the sharing stress is taken up by deformation of this zone and high stress concentrations do not reach the direct bond between the rigid inner sleeve and the elastomeric outer sleeve. The roller of FIG. 9, which is defined by rigid inner sleeve 70 and elastomeric sleeve 124 may then be assembled onto a metallic hub as shown in FIG. 10. Metallic hub P includes an outer cylindrical surface 130 and a central bore 132 for mounting hub P on a shaft. The diameter of outer surface 130 of hub P may be press fit with respect to inner cylindrical surface 134 of rigid sleeve 70 so that rigid sleeve 70 may be pressed onto hub P. It should be recognized that it is also possible to key or otherwise suitably secure sleeve 70 onto hub P. With the present arrangement, deterioration or destruction of elastomeric material 124 in use of the roller merely requires that the roller of FIG. 9 be removed from the hub of FIG. 10 and a new roller of the type shown in FIG. 9 again secured to the hub of FIG. 10. With such an arrangement, it is possible to replace the elastomeric roller on site and it is not necessary to ship or otherwise handle hub P or to keep on hand an unnecessary supply of hubs P.

While those skilled in the art will readily be aware that many different types of materials may be used in making the roller of the present invention, examples of suitable materials will be given merely for purposes of illustration. The resin with which fiberglass filaments 20 are coated may be a polyester resin and one suitable type of polyester resin is identified P–531 which is available from Escon Chemicals Pty. Limited of Abbot Road, Seven Hills, N.S.W. Australia. The fiberglass filaments 20 may be of the type identified as 30–E888–TRT–057 Silane Treated which is available from Australian Fibre-Glas Pty. Limited, Burrows Road, Alexandria N.S.W. Australia. The bonding agent which is applied to the exterior surface of rigid sleeve 70 prior to molding elastomeric material 124 thereon may be of the type identified as Chemlock 220 for natural rubber or Neoprene rubber elastomeric material and Chemlock 218 for polyurethane material. These bonding agents are available from Hughson Chemical Company, Erie, Pennsylvania.

In one arrangement, mandrel 40 is preheated prior to winding resin coated filaments 20 thereon and a desirable preheat temperature is around 180° F. With the resin described, oven K may be heated to a temperature of 200° F. and mandrel 40 rotated therein for 15 minutes to partially solidify the resin material. Rigid sleeve 70 is then heated at 200 degrees in oven M for a period of around 45 minutes to finally cure the resin.

It should be recognized that it is extremely important to keep the exterior surface of rigid sleeve 70 completely free from fingermarks or other contamination after the machining step described with reference to FIG. 6. This is necessary so that the bonding agent will firmly grip the exterior surface of rigid sleeve 70. It will also be recognized that once sleeve 70 is coated with the bonding agent, it is allowed to stand until all solvent has evaporated from the bonding agent prior to molding of elastomeric material 124 onto sleeve 70. The resin and fiberglass sleeve is completely uneffected by several hours exposure to temperatures as high as 300° F. during curing of elastomeric material 124.

With the materials described, the particular resin is desirable for its low and reproducable shrinkage properties, the compatibility of its catalyst with the elastomeric material during curing of the elastomeric material, and its high-temperature resistance so that it will not flow during high-temperature curing of the elastomeric material. The type of fiberglass described is desirable for its small diameter which provides maximum surface areas but slow and difficult wetting by the resin. Large filament diameters are easily wetted by the resin but break rather easily during surface preparation as described with reference to FIG. 6. Of course, the number of strands or filaments in a bundle also affects wetting time of the fiberglass filaments. The temperature of the mandrel, and the curing temperatures, are controlled in order to obtain even shrinkage and final dimensions which are accurate. It will also be recognized that the distance from resin B in tank A of FIG. 1 to mandrel 40 is important, as is the rotational speed of mandrel 40, so that resin B may thoroughly wet filaments 20 prior to their being wound upon mandrel 40. In addition, carriage D slowly traverses back and forth across screw E to lay successive filament layers on mandrel 40 and allow sufficient time for trapped air bubbles to escape from the resin in one layer before the next filament layer is applied.

It should be recognized that machining of rigid sleeve 70 substantially trues its outer surface and makes it substantially dynamically balanced. In addition, the application of elastomeric 124 to rigid sleeve 70 produces a roller which is substantially balanced and is very light in weight as compared to metallic hub P. Therefore, hub P of FIG. 10 may be independently balanced and will not have to be balanced again when new roller assemblies are applied thereto. As is well known, hubs P of the type used in steel mills may weigh several tons and the present invention makes it possible to apply a new elastomeric sleeve to the hub without removing the hub from the place of use. In addition, the elastomeric roller is very light in weight as compared to the weight of the hub and the assembly does not have to be rebalanced every time a new elastomeric roller is applied to the hub.

While the invention has been described with reference to a preferred embodiment, it is obvious that modifications and alterations will occur to others upon the reading and understanding of this specification.

Having thus described my invention, I claim:

1. A roller sleeve comprising; a substantially cylindrical and substantially rigid sleeve member, said rigid sleeve member being formed of fibrous reinforcement and synthetic plastic material, said rigid sleeve having an inner cylindrical surface and an outer cylindrical surface, said outer surface being substantially free of visible plastic material, said fibrous reinforcement being exposed at said outer surface and defining substantially fuzzy surface characteristics on said outer surface.

2. The roller sleeve of claim 1 and further including a substantially cylindrical elastomeric sleeve member having an inner cylindrical surface and an outer cylindrical surface, said inner cylindrical surface of said elastomeric sleeve being bonded to said outer surface of said rigid sleeve.

3. The device of claim 2 and further including a bonding agent interposed between said outer surface of said rigid sleeve and said inner surface of said outer sleeve.

4. The device of claim 3 wherein said fibrous reinforcement comprises at least one substantially continuous filament of fiberglass 5. The device of claim 1 wherein said fibrous reinforcement comprises at least one substantially continuous spirally wound filament wound layer-upon-layer and including an external layer, said filament being substantially impregnated with said plastic material, said fuzzy surface characteristics being defined by fibrous portions of said external layer of said filament.

6. The device of claim 5 and further including a substantially cylindrical elastomeric sleeve member having an inner cylindrical surface and an outer cylindrical surface, said inner surface of said elastomeric sleeve being bonded to said outer surface of said rigid sleeve, said fibrous portions extending inwardly of said inner surface of said elastomeric sleeve member toward said outer surface of said elastomeric sleeve member.

7. The device of claim 6 and further including a bonding agent coating said exterior surface of said rigid sleeve and said fibrous portions of said external layer of said filament.

8. The device of claim 7 wherein said filament comprises fiber glass.

* * * * *